W. H. WELCH.
ELECTRICAL VULCANIZER.
APPLICATION FILED JULY 25, 1912.

1,057,904.

Patented Apr. 1, 1913.
5 SHEETS—SHEET 1.

Witnesses

Inventor
Walter Henry Welch
his Attorneys

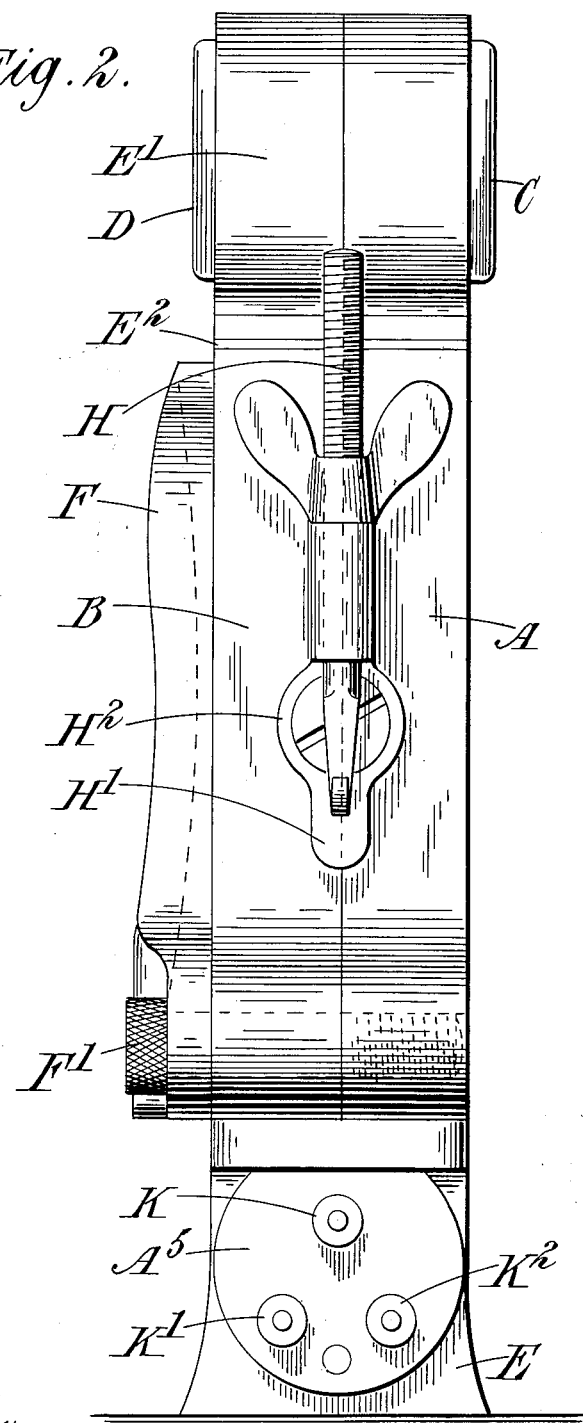

W. H. WELCH.
ELECTRICAL VULCANIZER.
APPLICATION FILED JULY 25, 1912.
1,057,904.
Patented Apr. 1, 1913.
5 SHEETS—SHEET 3.
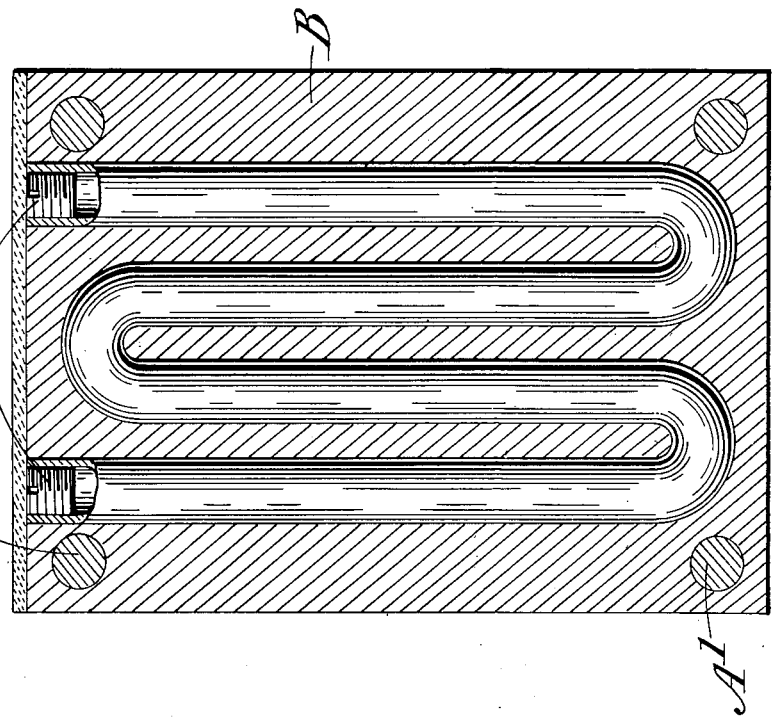
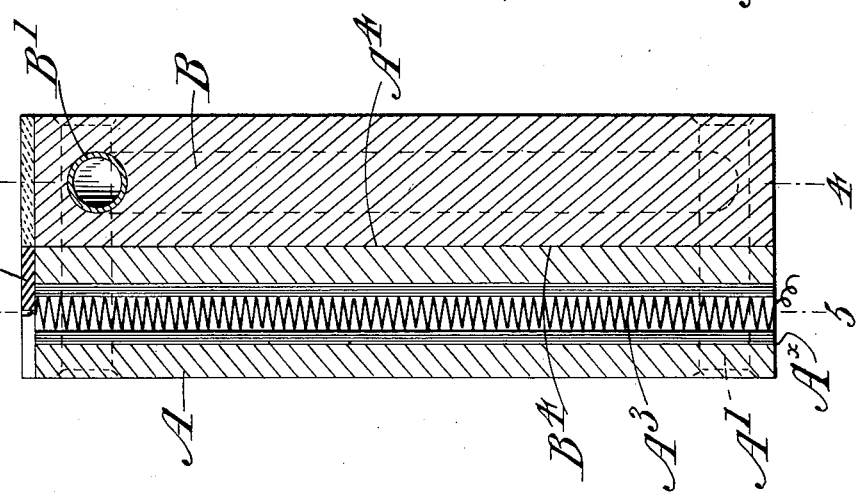

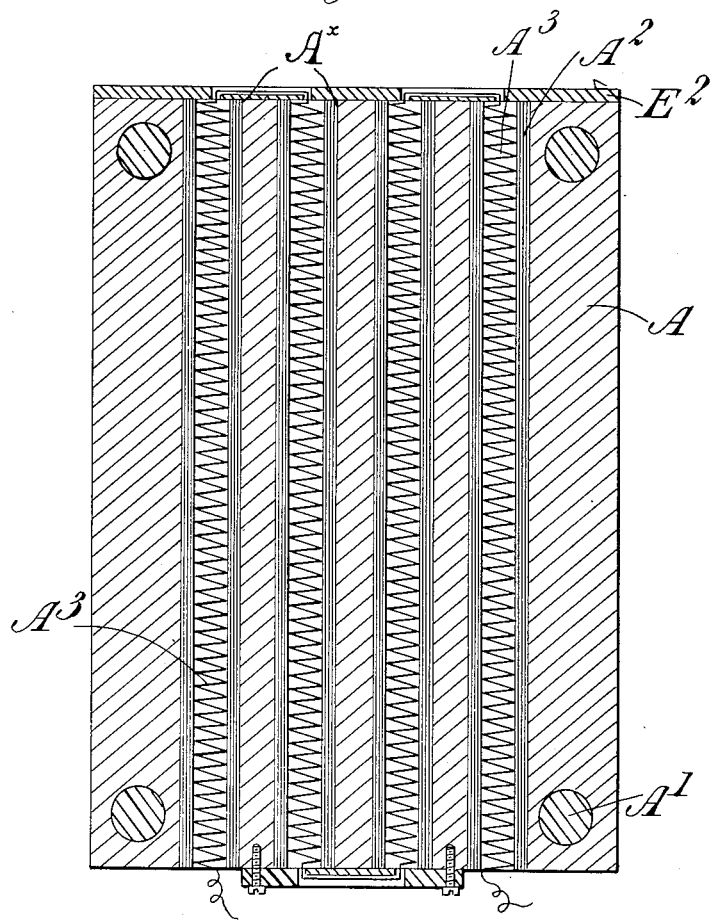

W. H. WELCH.
ELECTRICAL VULCANIZER.
APPLICATION FILED JULY 25, 1912.

1,057,904.

Patented Apr. 1, 1913.
5 SHEETS—SHEET 5.

UNITED STATES PATENT OFFICE.

WALTER HENRY WELCH, OF LONDON, ENGLAND, ASSIGNOR TO HARVEY FROST & COMPANY LIMITED, OF LONDON, ENGLAND.

ELECTRICAL VULCANIZER.

1,057,904.　　　Specification of Letters Patent.　　Patented Apr. 1, 1913.

Application filed July 25, 1912. Serial No. 711,565.

*To all whom it may concern:*

Be it known that I, WALTER HENRY WELCH, subject of the King of England, residing at London, England, have invented certain new and useful Improvements in Electrical Vulcanizers, of which the following is a specification.

This invention relates to electrical vulcanizing apparatus and has for its object to provide a simple and efficient portable vulcanizer.

Where an electrical heating unit is placed in a metal body to serve as a vulcanizer the heat becomes unduly concentrated over the unit and the object of the present invention is to so arrange the apparatus that this heat may be more thoroughly distributed over the surface of the vulcanizer so that efficient work can be done on all parts of the working surface.

For this purpose the present invention consists in combining an electrical heating unit situated in one part of the vulcanizer with a vulcanizing table wherein is provided space for water or steam so disposed that the electrical heating unit will heat the water or generate steam whereby the whole working surface of the vulcanizer will be heated.

The temperature at which the apparatus works is preferably controlled. This is done by means of a thermostat in the form of an electric cut-out operated by movements in a pressure or temperature gage consequent upon variation of temperature of the heater or of the pressure of the steam to make and break the electrical circuit should that temperature or pressure at any time become too great.

Figure 1:
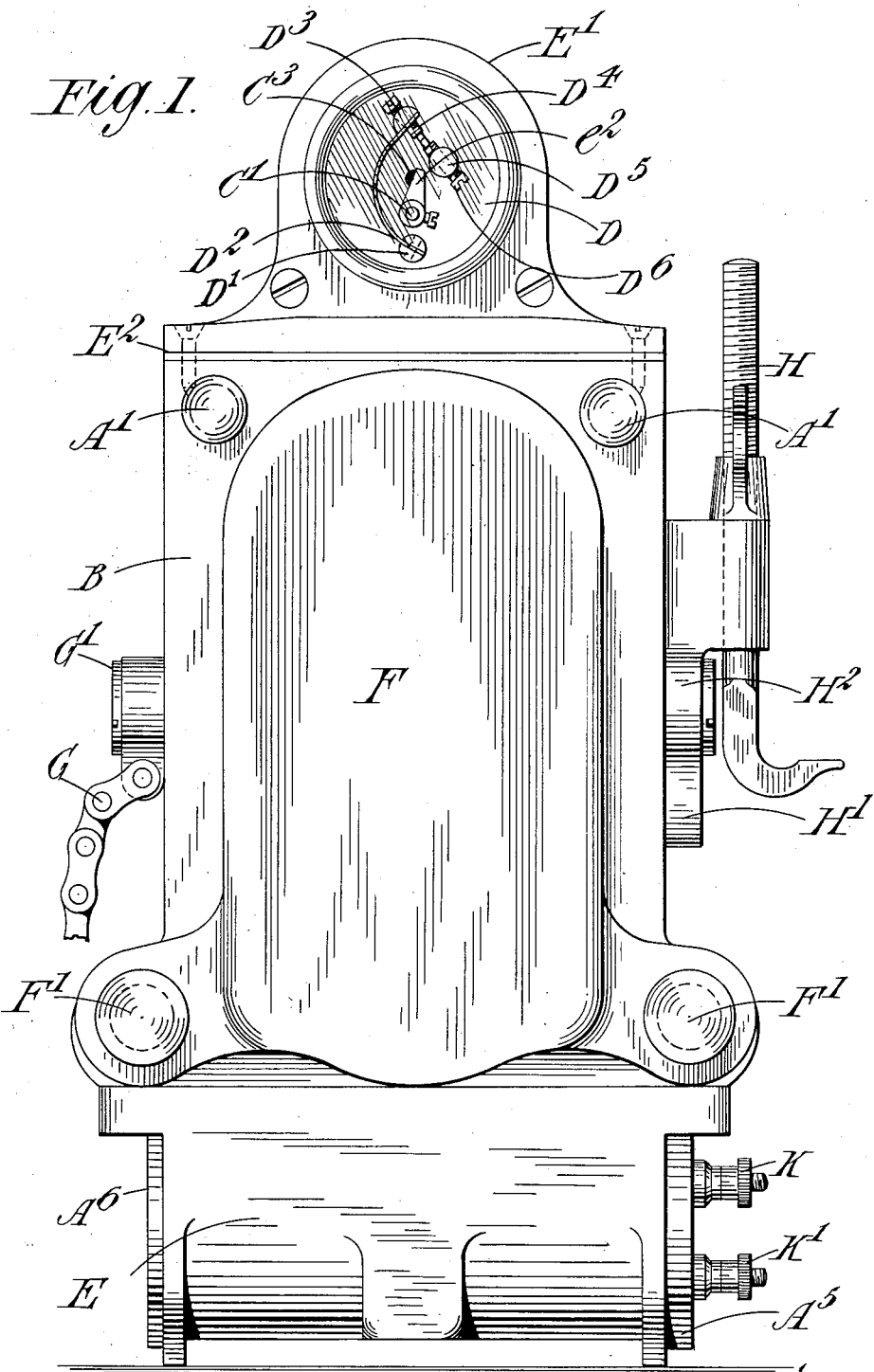
Figure 6:
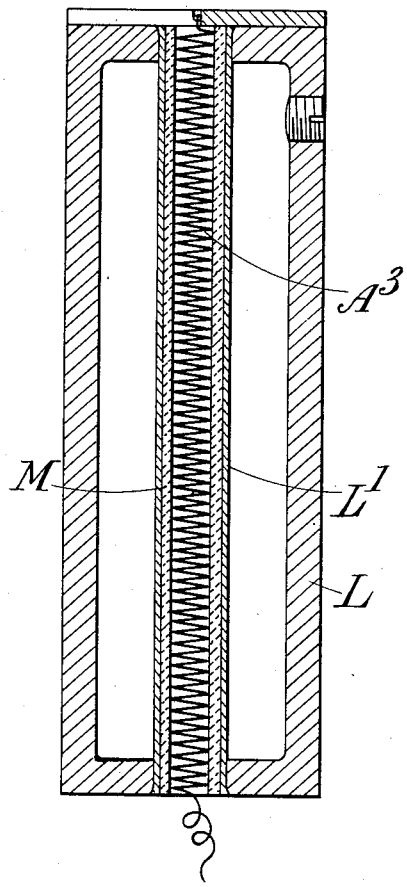
Figure 7:
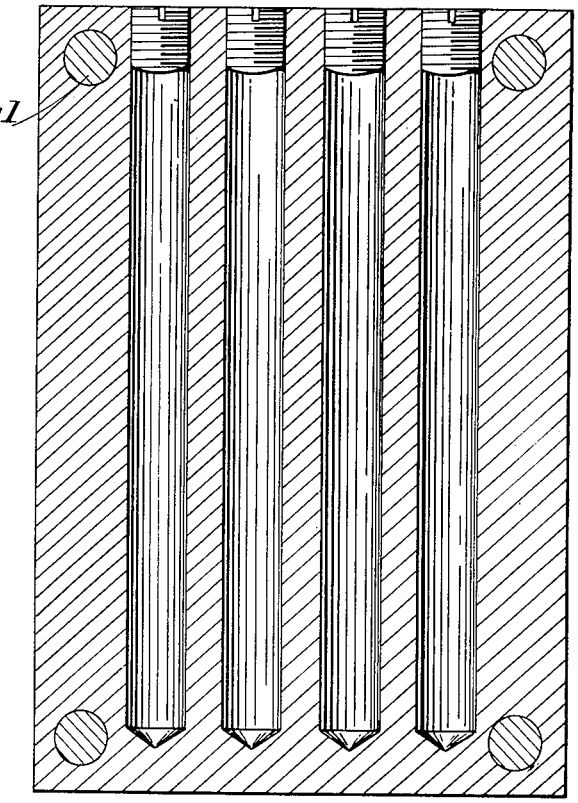

In the accompanying drawings which illustrate the invention Figure 1 is a front elevation of the complete device showing also the thermostat; Fig. 2 is a side elevation of Fig. 1 viewed from the right; Fig. 3 is a partly diagrammatic sectional elevation of the electrically heated block and the vulcanizing or temperature-distributer block secured together; Fig. 4 is a sectional elevation on the line 4—4 of Fig. 3; Fig. 5 is a sectional elevation of the electrically heated block on line 5—5 of Fig. 3; Figs. 6 and 7 are sectional views of a modified form of the complete apparatus and the distributer block respectively.

The general body of the apparatus, A, B, is secured to a hollow stand-like portion E and has mounted upon it and suitably attached to it at its upper part a pressure gage C and thermostat or cut-out D both suitably cased and held in place by a divided metal cover $E^1$. The body portion is divided into two parts A and B of which A is the electrically heated block and B is the vulcanizing or temperature-distributer block. These two parts are held in contact by rivets $A^1$.

The steam heated temperature-distributer block B is cast as described about the coil or pipe $B^1$ which is more or less filled with water, plugged at $B^2$ with screw plugs for cleaning purposes or for replenishing with water and is connected to the pressure gage C. Adjacent the block B is a block A which it will be seen is bored from end to end with holes $A^x$, lined as at $A^2$ with sheet mica, inside which is the heating coil $A^3$ of any suitable kind of resistance wire electrically insulated by the mica from the metal body. The surfaces $A^4$, $B^4$ are faced and held in close contact by the rivets $A^1$. The coils $A^3$ are passed from end to end of their containing block, being so arranged that the holes are completely filled and so that the wires for making connection to the electric current supply both come out at one end. The ends of the block are insulated, in this case by cork or mica strips $E^2$, and holes are bored through the strips large enough to receive the thickness of the wire, while the strip or sheet is slitted and slotted up to the holes at the inner lengths of the coil so that the wire can be slipped therethrough into the hole. The coil of the wire is straightened and the wire brought to the axes of the coil at the ends where the turns are made so that only the single wire passes through the insulator as in Fig. 5.

A vulcanizer mold, form or table F is secured to the outer face of the portion B by screws $F^1$ and the work may be held in place by a chain G swiveled upon the body of the device at $G^1$; and by a wing-nutted screw H which can slide but not turn in the swiveled socket $H^1$, upon the casing at $H^2$. The hollow stand or base E receives and protects the leads which come from the heater coils, and has an opening at both ends and a cover to each opening indicated at $A^5$ and $A^6$. These covers are of vulcanized fiber; the cover $A^5$ is provided with three terminals K K¹ K² which may be used in pairs to connect the electrical part of the device to the requisite current supply.

The dial of the pressure gage, C, is suitably graduated to indicate the pressure of steam generated in the temperature-distributer block with the steam-space of which it is connected and the spindle C¹ bearing the pointer passes from the pressure gage to the thermostat D. Suitably secured to C¹ is an arm $e^2$ with an insulating projection C³ fixed upon it. Clamped to a post D¹ is a bow-spring D² through the enlarged end D³ of which passes an electric contact screw D⁴. Secured to an insulating base-plate is a post D⁵ through which passes a second contact screw D⁶; the posts D¹ and D⁵ are placed by suitable connections within the electric circuit.

In Fig. 6 a modified form of complete heating block is shown. The block L is made hollow and has tubes L¹ expanded or otherwise tightly secured into its ends. The water with which the hollow block is filled surrounds the tubes and receives the heat given up by the electrical heating coil or within the tubes. Porcelain insulation is indicated at M.

In Fig. 7 the temperature-distributer block is simply made by boring separate holes nearly through the length of the block and plugging the same whether filled or not with water.

In operation a pair of the terminals K and K¹ or K and K² are connected to the electric supply. If the one pair is used a normal length of heating coil comes into effect and if the other pair is employed a greater length emits heat. When the apparatus is at work, current passes from the terminals through the coils of resistance wire and causes them to become hot. The heat generated is communicated to the body of the metal surrounding the heater in the coils and from this it is in turn communicated to the temperature-distributer block in such a way that the water contained in the coil of pipe is either highly heated or turned into steam. The heat is then uniformly transferred to the body of the metal of the temperature-distributer block and thence produces the desired vulcanizing effect upon the material secured to the vulcanizing table or mold F. Should the steam pressure become greater than a certain maximum the pressure gage will indicate this by a movement of its pointer and in this movement will rotate the spindle C¹ to such a position that the arm $e^2$ will carry the projection C³ against the bow-spring D², thus to force apart the contacts D⁴ and D⁶. The passage of the electric current will consequently be cut off and heating will cease until the pressure in the vulcanizer falls, when the arm C² will move back permitting electric contact to be once more established between D⁴ and D⁶ and heat to be generated till the temperature again reaches a predetermined maximum. It will therefore be seen that the temperature and pressure of steam being largely interdependent as is well known, a very regular temperature can be maintained for a long period, with the result that the process of vulcanizing is rendered more certain, and incidentally safer also.

The thermostat may be operated directly by a change of temperature but this is found not to be so convenient as the method of regulating the same by causing the cut-out to act by variation of pressure.

What I claim as my invention and desire to secure by Letters Patent is:—

1. In a vulcanizing apparatus the combination of a metallic section; electrical heating coils located in said section; a second metallic section disposed in close contact with the electrically heated section, and providing a vulcanizing surface; and means for holding water in said second section, substantially as described.

2. In a vulcanizing apparatus the combination of a metallic block provided with a boring; an electrical heating coil located within said boring; a second metallic block disposed in close contact with the electrically heated block, and providing a vulcanizing surface; and said second block provided with a boring for containing water, substantially as described.

3. In a vulcanizing apparatus the combination of a solid metallic block provided with a plurality of borings; electrical heating coils located within said borings; a second solid metallic block disposed in close contact with the electrically heated block, and providing a vulcanizing surface; said second block being provided with a plurality of borings for containing water, substantially as described.

4. In a vulcanizing apparatus the combination of a solid metallic block having a smooth face provided with a plurality of borings; mica linings for said borings; electrical heating coils located within said mica linings; a second solid metallic block having a smooth face disposed in intimate contact with the smooth face of the electrically heated block; and providing a vulcanizing surface; said second block being provided with a boring for containing water; and means for detachably holding said blocks with said faces in contact, substantially as described.

5. In a vulcanizing apparatus the combination of a solid metallic block having a smooth face, and provided with a plurality of borings therethrough disposed in parallel relation; mica linings for said borings; electrical heating coils located within said linings and connected in series; a second solid metallic block having a smooth face disposed in intimate contact with the smooth face of the electrically heated block, and providing a vulcanizing surface; said second block being provided with a boring for containing water; and means for detachably holding said blocks with said faces in contact, substantially as described.

In testimony whereof I have signed my name to this specification in the presence of two subscribing witnesses.

WALTER HENRY WELCH.

Witnesses:
 H. HARVEY FROST,
 WILLIAM FROST.